(12) United States Patent
Saito

(10) Patent No.: US 10,291,821 B2
(45) Date of Patent: May 14, 2019

(54) SERVER RECEIVING IMAGE DATA FROM TERMINAL DEVICE AND TRANSMITTING PRINT INSTRUCTION TO PRINTER, AND NON-TRANSITORY COMPUTER READABLE STORAGE MEDIUM STORING PROGRAM INSTRUCTIONS FOR CONTROLLING THE SERVER

(71) Applicant: BROTHER KOGYO KABUSHIKI KAISHA, Nagoya, Aichi (JP)

(72) Inventor: Ken Saito, Tokoname (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 15/912,787

(22) Filed: Mar. 6, 2018

(65) Prior Publication Data

US 2018/0367701 A1 Dec. 20, 2018

(30) Foreign Application Priority Data

Jun. 15, 2017 (JP) ................. 2017-117797

(51) Int. Cl.
*H04N 1/44* (2006.01)
*H04N 1/327* (2006.01)
*H04N 1/32* (2006.01)

(52) U.S. Cl.
CPC ....... *H04N 1/4426* (2013.01); *H04N 1/32117* (2013.01); *H04N 1/32778* (2013.01); *H04N 1/4413* (2013.01); *H04N 2201/0094* (2013.01)

(58) Field of Classification Search
CPC combination set(s) only.
See application file for complete search history.

(56) References Cited

U.S. PATENT DOCUMENTS 6,970,263 B2 11/2005 Suzuki et al.
9,451,432 B2 9/2016 Arai
(Continued)

FOREIGN PATENT DOCUMENTS

JP 2002-032205 A 1/2002
JP 2010-282624 A 12/2010
(Continued)

OTHER PUBLICATIONS

Notice of Allowance dated Mar. 16, 2018 from related U.S. Appl. No. 15/336,175.
(Continued)

*Primary Examiner* — Helen Zong
(74) *Attorney, Agent, or Firm* — Scully, Scott, Murphy & Presser, PC

(57) ABSTRACT

In a server, a processor receives, in a case where the memory does not store image data in association with a first identifier identifying a user, from a printer the first identifier inputted to the printer through a user's operation and transmits first location information to the printer for prompting that the first location information is inputted to a terminal device. The first location information includes related information related thereto. The processor receives target image data and second location information from the terminal device, and stores related image data in association with the first identifier. The processor receives a second identifier from the printer and transmits a print instruction to the printer in a case where the received second identifier matches the stored first identifier. The processor prohibits transmission of the print instruction to the printer in a case where the received second identifier does not match the first identifier.

11 Claims, 9 Drawing Sheets

(56) References Cited

U.S. PATENT DOCUMENTS

| | | | |
|---|---|---|---|
| 2005/0270569 A1* | 12/2005 | Hayashi | H04N 1/00204 358/1.15 |
| 2007/0229891 A1 | 10/2007 | Yanagi et al. | |
| 2008/0033955 A1 | 2/2008 | Fujii | |
| 2010/0309503 A1 | 12/2010 | Partridge et al. | |
| 2012/0026536 A1 | 2/2012 | Shah | |
| 2012/0110065 A1 | 5/2012 | Oshima et al. | |
| 2013/0086638 A1 | 4/2013 | Itogawa et al. | |
| 2014/0132981 A1 | 5/2014 | Song et al. | |
| 2017/0126926 A1 | 5/2017 | Saito | |

FOREIGN PATENT DOCUMENTS

| | | |
|---|---|---|
| JP | 2013-080300 A | 5/2013 |
| JP | 2013-156952 A | 8/2013 |
| JP | 2017-084217 A | 5/2017 |

OTHER PUBLICATIONS

U.S. Appl. No. 15/336,175, filed Oct. 27, 2016.
Office Action dated Jun. 14, 2018 from related application U.S. Appl. No. 15/716,814.
U.S. Appl. No. 15/716,814, filed Sep. 27, 2017.

\* cited by examiner

FIG. 2

PRINTER INFORMATION TABLE 28

| MODEL NAME | PRINT FUNCTION INFO |
|---|---|
| MN1 | PF1 |
| : | : |

PRINTER ID TABLE 30

| MAC ADDRESS | MODEL NAME | PRINTER ID |
|---|---|---|
| MA1 | MN1 | p12345 |
| : | : | : |

CARD ID TABLE 32

| CARD ID | USER NAME | PRINTER ID |
|---|---|---|
| c12345 | user1 | p12345 |
| : | : | : |

(OMITTED IN SECOND AND THIRD EMBODIMENTS)

JOB ID TABLE 34

| PRINTER ID | JOB ID | FILE NAME | PRINT SETTING INFO | DATA ID | USER NAME |
|---|---|---|---|---|---|
| p12345 | j12345 | file1.pdf | PS1 | d12345 | user1 |
| : | : | : | : | : | : |

(SECOND EMBODIMENT)

| PIN CODE |
|---|
| PC1 |
| : |

(THIRD EMBODIMENT) BARCODE ID TABLE 36

| BARCODE ID | MAC ADDRESS | JOB ID | PIN CODE |
|---|---|---|---|
| b12345 | MA1 | j12345 | PC1 |
| : | : | : | : |

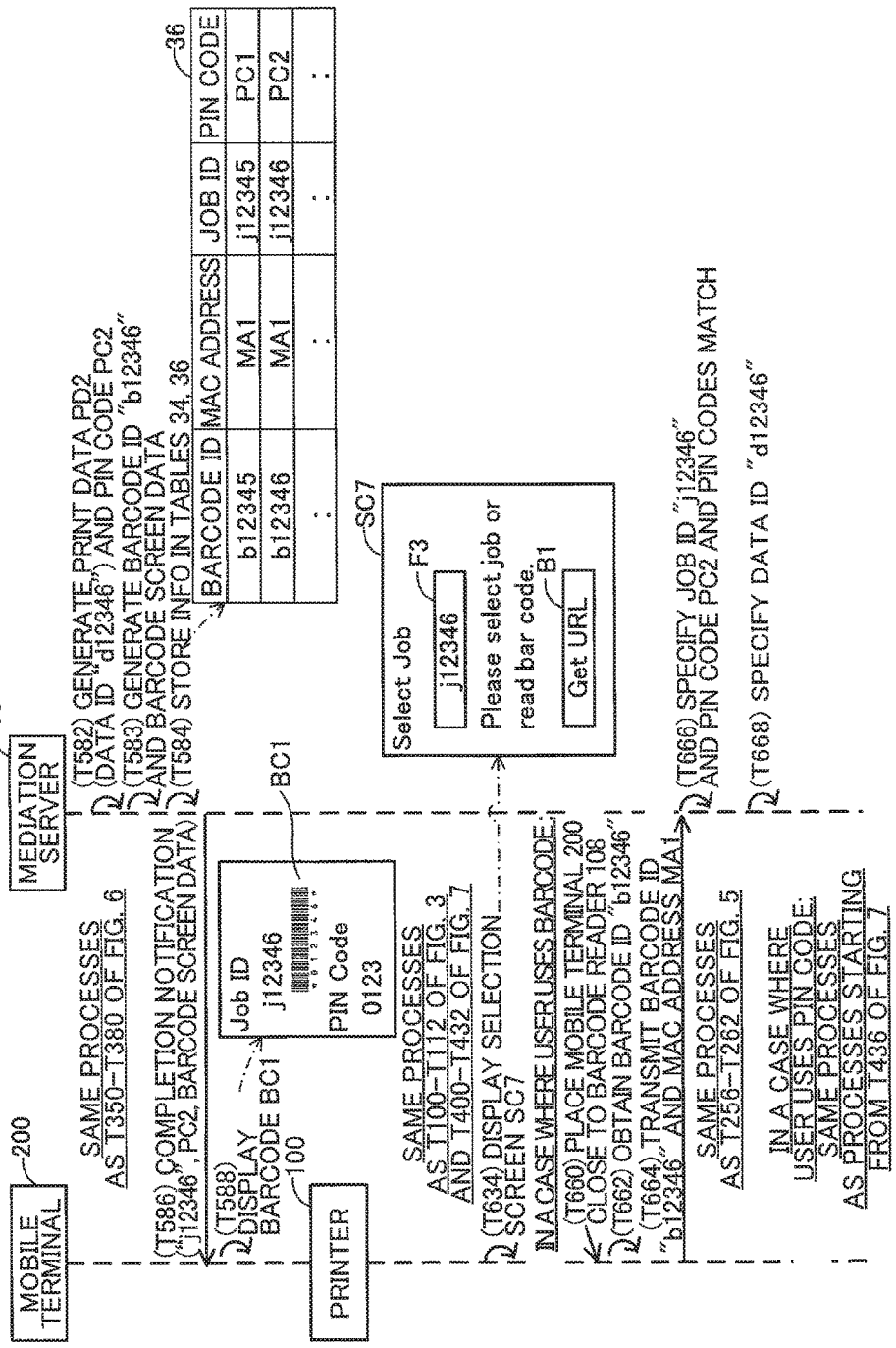

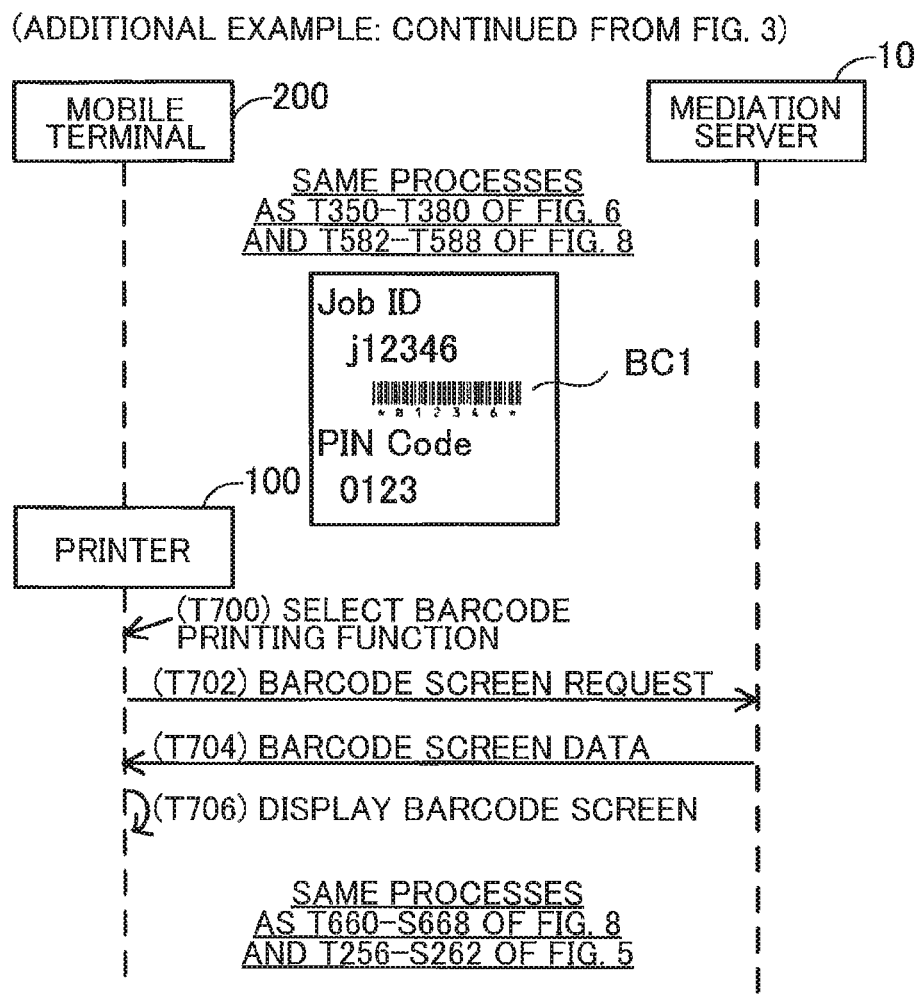

SERVER RECEIVING IMAGE DATA FROM TERMINAL DEVICE AND TRANSMITTING PRINT INSTRUCTION TO PRINTER, AND NON-TRANSITORY COMPUTER READABLE STORAGE MEDIUM STORING PROGRAM INSTRUCTIONS FOR CONTROLLING THE SERVER

CROSS REFERENCE TO RELATED APPLICATION

This application claims priority from Japanese Patent Application No. 2017-117797 filed Jun. 15, 2017. The entire content of the priority application is incorporated herein by reference.

TECHNICAL FIELD

The present disclosure relates to a server which receives image data from a terminal device and transmits to a printer a print instruction of an image represented by the image data.

BACKGROUND

Conventionally, a multifunction peripheral (MFP) receives upload screen data from a mediation server, and displays an upload screen when receiving a predetermined instruction from a user. The upload screen includes a QR code (registered trademark) and a print instruction button for accepting a print instruction. After the upload screen is displayed on the MFP, a mobile terminal obtains by using the QR code coded data of URL which includes a job ID generated terminal by the mediation server, and transmits image data representing an image by using the URL extracted from the coded data. The mediation server stores the job ID and the image data associated with each other. When the image data is stored in the mediation server and then the user selects the print instruction button in the upload screen, the mediation server receives a storage confirmation request including the job ID from the MFP, specifies the image data by using the job ID, and transmits the specified image data to the MFP.

SUMMARY

In the above technique, when the user uploads image data to the mediation server and then a third person different from the user selects the print instruction button in the upload screen, the MFP receives the image data from the mediation server and prints the image data. That is, this technique is likely to supply to the third person a printed material of an image represented by the image data uploaded to the mediation server by the user.

The present disclosure provides a technique for preventing a printed material of an image represented by image data from being supplied to a third person in a system in which a terminal device transmits image data to a server when location information of a server is inputted to the terminal device via a printer.

In order to attain the above and other objects, the disclosure provides a server. The server includes a communication interface, a memory and a processor. The processor is configured to perform: receiving, in a non-storing case where the memory does not store image data in association with a first identifier identifying a user, from a printer via the communication interface the first identifier which has been inputted to the printer; after the first identifier is received in the non-storing case, transmitting first location information to the printer via the communication interface for prompting that the first location information is inputted to a terminal device, the first location information designating a location in the server and including related information related to the first identifier; receiving second location information matching the first location information from the terminal device via the communication interface; receiving target image data from the terminal device via the communication interface after the first location information is inputted to the terminal device; after the target image data and the second location information matching the first location information are received from the terminal device, storing related image data in the memory, the related image data being related to the target image data, the related image data and the first identifier being stored in the memory in association with each other; receiving, in a storing case where the memory stores the related image data and the first identifier associated with each other, a second identifier from the printer via the communication interface, the second identifier having been inputted to the printer; and transmitting a print instruction to the printer via the communication interface in a case where the received second identifier matches the first identifier stored in the memory, the print instruction being for printing an image represented by the related image data associated with the first identifier, wherein the processor prohibits transmission of the print instruction to the printer in a case where the received second identifier does not match the first identifier stored in the memory.

According to another aspects, the disclosure provides a non-transitory computer readable storage medium storing a set of program instructions installed on and executed by a computer for controlling a server having a communication interface and a memory. The set of program instructions includes: receiving, in a non-storing case where the memory does not store image data in association with a first identifier identifying a user, from a printer via the communication interface the first identifier which has been inputted to the printer; after the first identifier is received in the non-storing case, transmitting first location information to the printer via the communication interface for prompting that the first location information is inputted to a terminal device, the first location information designating a location in the server and including related information related to the first identifier; receiving second location information matching the first location information from the terminal device via the communication interface; receiving target image data from the terminal device via the communication interface after the first location information is inputted to the terminal device; after the target image data and the second location information matching the first location information are received from the terminal device, storing related image data in the memory, the related image data being related to the target image data, the related image data and the first identifier being stored in the memory in association with each other; receiving, in a storing case where the memory stores the related image data and the first identifier associated with each other, a second identifier from the printer via the communication interface, the second identifier having been inputted to the printer; and transmitting a print instruction to the printer via the communication interface in a case where the received second identifier matches the first identifier stored in the memory, the print instruction being for printing an image represented by the related image data associated with the first identifier, wherein the processor prohibits transmission of the print instruction to the printer in a case where the received second identifier does not match the first identifier stored in the memory.

BRIEF DESCRIPTION OF THE DRAWINGS

The particular features and advantages of the disclosure as well as other objects will become apparent from the following description taken in connection with the accompanying drawings, in which:

FIG. 2 is an explanation diagram illustrating a printer information table, a job ID table, a printer ID table, a card ID table according to the first-third embodiments and a barcode ID table according to the third embodiment;

FIG. 8 is a sequence diagram illustrating a remaining process for storing print data in the mediation server continued from the process shown in FIG. 3 according to the third embodiment; and FIG. 9 is a sequence diagram illustrating a process for printing print data stored in the mediation server according to an additional example.

DETAILED DESCRIPTION (First Embodiment) (Configurations of Communication System 2)

Figure 1:
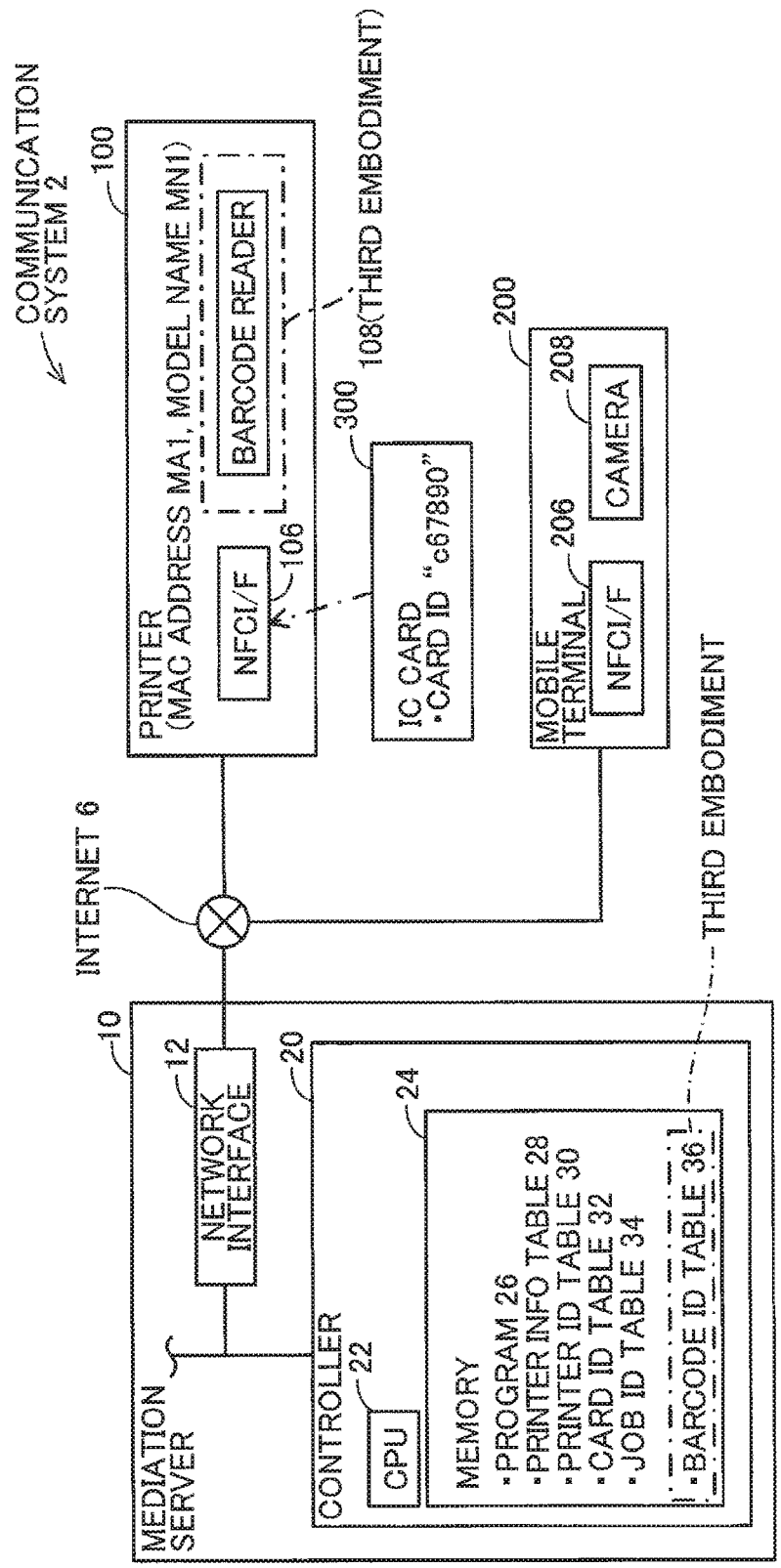
FIG. 1 is a block diagram illustrating a communication system according to first-third embodiments.

As illustrated in FIG. 1, the communication system 2 includes an mediation server 10, a printer 100, and a mobile terminal 200 connected with Internet 6. The system 2 may further include one or more printers.

The printer 100 is a peripheral device (i.e., a peripheral device of the mobile terminal 200) which can execute a printing function. The printer 100 includes a Near Field Commutation (NFC) interface 106. The NFC interface 106 is an interface executing NFC communication which is wireless communication according to a NFC method. The NFC method is a wireless communication method based on international standards such as ISO/IEC 21481 or 18092. The NFC interface 106 can execute NFC communication with an IC card 300 including an NFC tag.

The IC card 300 is provided from an administrator of the printer 100 to a user who uses the printer 100. The NFC tag of the IC card 300 stores in advance a card Identifier (ID) "c67890" for identifying the IC card 300. The card ID "c67890" may be stored in the NFC tag at a shipping stage of the IC card 300 or may be stored in the NFC tag by the administrator before the IC card 300 is provided to the user.

The card ID "c67890" is an identifier for identifying the user because the card ID is stored in the IC card 300 which is used by the user.

The mobile terminal 200 is a portable terminal device such as a mobile telephone (e.g., smartphone), a PDA, and a tablet terminal. The mobile terminal 200 includes a NFC interface 206 and a camera 208. The NFC interface 206 can execute NFC communication with the NFC interface 106 of the printer 100. In the present embodiment, each of the devices 100, 200 and 300 executes NFC communication. However, in modifications, each of the devices 100, 200 and 300 may execute short-range wireless communication (e.g., infrared communication, BlueTooth (registered trademark) communication or TransferJet (registered trademark) communication) different from the NFC.

(Configurations of Server 10)

The mediation server 10 is provided on the Internet 6 by a vendor of the printer 100 for example. The mediation server 10 is a server which mediates communication related to printing of images between a terminal device (e.g., 200) and the printer (e.g., 100). More specifically, the mediation server 10 receives a file including image data from the terminal device, converts the file to generate print data including a data format which the printer can interpret, and transmits the print data to the printer. The mediation server 10 executes the above processes, so that it is not necessary to install a driver program in the terminal device.

The mediation server 10 includes a network interface 12 and a controller 20. The network interface 12 is connected with the Internet 6. The controller 20 includes a CPU 22 and a memory 24. The CPU 22 executes various processes according to a program 26 stored in the memory 24. The memory 24 is configured as a volatile memory or a non-volatile memory. The memory 24 stores a printer information table 28, a printer ID table 30, a card ID table 32, and a job ID table 34.

Each of the tables 28-34 in the memory 24 will be explained with reference to FIG. 2. The printer information table 28 stores, associated with each other, a model name of a model of a printer, and print function information for each of one or more printers such as the printer 100. The printing function information indicates a function related to printing which the printer can execute. For example, the print function information includes information indicating a printable sheet size and information about whether duplex printing can be executed. A model name MN1 indicates a model of the printer 100. Print function information PF1 includes information indicating that the duplex printing can be executed, and information indicating that printing can be executed by using sheet sizes of A3 and A4. The vendor of the printer 100 registers information in the table 28. The memory 24 stores, associated with each other, a model name and a data format (not shown) which a printer having the model name can interpret for each printer. When the mediation server 10 generates print data which is to be transmitted to a printer, the mediation server 10 generates print data by converting a file (image data) by using a program suitable for the data format associated with the model name of the printer.

The printer ID table 30 stores, associated with each other, a Media Access Control (MAC) address allocated to a printer, a model name of the printer, and a printer ID for identifying the printer for each printer. A MAC address MA1 indicates a MAC address of the printer 100. When a printer transmits a MAC address to the mediation server 10, the MAC address is stored in the table 30. When the mediation server 10 generates a printer ID, the printer ID is stored in the table 30 (see FIG. 3 described below).

The card ID table 32 stores, associated with each other, a card ID for identifying an IC card used by a user, a user name indicating the user, and a printer ID for identifying a printer used by the user for each of one or more users. The printer transmits the card ID and the user name to the mediation server 10 so that the card ID and the user name are stored in the table 32 (see FIG. 3 described below).

The job ID table 34 stores, associated with each other, a printer ID, a job ID, a file name, print setting information, a data ID, and a user name of a user for each of one or more print jobs. Here, the job ID identifies the print job, and the printer ID identifies a printer which will execute a print job identified by the job ID. The file name is a name of a file including image data which represents an image which to be printed in the print job. The print setting information indicates printing settings (the number of print copies, information about whether duplex printing can be executed, and a sheet size) for executing the print job. The data ID identifies print data generated from the file. The user name is a name of a user who has requested that the printer executes the print job. When the terminal device transmits a file and print settings to the mediation server 10, the file name and the print setting information are stored in the table 34. When the mediation server 10 generates a job ID and a data ID, the job ID and the data ID are stored in the table 34 (explained below with reference to FIG. 4).

(Process for Obtaining URL of Mediation Server)

Next, a process for obtaining a URL will be described with reference to FIG. 3. Here, the URL is used for transmitting to the mediation server 10 a file including image data representing a print target image The CPU 22 of the mediation server 10 executes processes according to the program 26. However, in the following descriptions, the mediation server 10 instead of the word "CPU 22" is used as the subject of these processes for simplification. That is, in the following descriptions, the process performed by the mediation server 10 indicates the process performed by the CPU 22 according to the program 22. Further, the phrase "according to the program 26" is omitted. The mediation server 10 executes all communications via the network interface 12. Therefore, the phrase, "via the network interface 12", will be omitted below.

When the power is applied to the printer 100, the printer 100 displays a function screen for selecting one function from functions which the printer 100 can execute. Functions include an Internet print function for performing printing by using the mediation server 10, and a media printing function for obtaining image data from a storage medium and printing the image data. In T100, the user of the printer 100 uses the function screen to select the Internet print function from the functions.

When the Internet print function is selected in T100, in T102 the printer 100 transmits to the mediation server 10 a card screen request for requesting card screen data which represents a card screen. The card screen is a screen for prompting the user to place an IC card (e.g., 300) close to the NFC interface 106 of the printer 100, that is, prompting the user to perform an operation for causing the printer 100 to read a card ID in the IC card according to the NFC. The card screen request includes the MAC address MA1 of the printer 100, and the model name MN1 of the printer 100.

After receiving the card screen request from the printer 100 in T102, in T104 the mediation server 10 transmits the card screen data to the printer 100.

When receiving the card screen data from the mediation server 10 in T104, in T106 the printer 100 displays the card screen. In T110 the user places the IC card 300 close to the NFC interface 106 of the printer 100. Thus, NFC connection is established between the printer 100 and the IC card 300. A card ID "c67890" in the IC card 300 is transmitted from the IC card 300 to the printer 100 via the NFC connection. That is, the printer 100 reads the card ID "c67890" from the IC card 300. The card ID "c67890" is inputted to the printer 100. The user does not need to operate an operation interface (not shown) of the printer 100 and manually input a card ID to the printer 100, thereby improving user friendliness. In T112, the printer 100 transmits the inputted card ID "c67890" to the mediation server 10.

When receiving the card ID "c67890" from the printer 100 in T112, in S10 the mediation server 10 determines whether the received card ID "c67890" matches a card ID in the card ID table 32 (see FIG. 2) in S10. In a situation shown in FIG. 3 where the card ID "c67890" is not yet stored in the card ID table 32, the mediation server 10 makes NO determination in S10. Then, the process goes to T120.

When the mediation server 10 receives the card ID "c67890" from the printer 100 in a state where the card ID "c67890" is stored in the card ID table 32, the mediation server 10 makes YES determination in S10, and skips T120-T128 described below and goes to T130.

In T120 the mediation server 10 transmits, to the printer 100, user input screen data which represents a user input screen for inputting the user name.

After receiving the user input screen data from the mediation server 10 in T120, in T122 the printer 100 displays the user input screen. In T124, the user inputs a user name "user2" to the user input screen. In this case, in T126, the printer 100 transmits the user name "user2" inputted in T124 to the mediation server 10.

When receiving the user name "user2" from the printer 100 in T126, the mediation server 10 determines whether the MAC address MA1 received in T102 has been stored in the printer ID table 30 (see FIG. 2). When determining that the MAC address MA1 is not stored in the printer ID table 30, in T128 the mediation server 10 generates a printer ID "p12345" which is an ID so to be allocated to the printer 100. Furthermore, the mediation server 10 stores, so as to be associated with each other, the MAC address MA1 received in T102, the model name MN1 received in T102, and the generated printer ID "p12345" in the printer ID table 30. The mediation server 10 further stores, associated with each other, the card ID "c67890" received in T112, the user name "user2" received in T126, and the generated printer ID "p12345" in the card ID table 32.

When determining that the MAC address MA1 has already been stored in the printer ID table 30, in T128 the mediation server 10 specifies the printer ID "p12345" associated with the MAC address MA1 received in T102 from the printer ID table 30. The mediation server 10 stores, so as to be associated with each other, the card ID "c67890" received in T112, the user name "user2" received in T126, and the specified printer ID "p12345" in the card ID table 32.

In T130, the mediation server 10 determines whether a job ID associated with both the printer ID "p12345" and the user name "user2" has already been stored in the job ID table 34 (see FIG. 2). In a situation of FIG. 3 the job ID is not yet stored in the job ID table 34, and then the mediation server 10 determines that the job ID is not stored in the job ID table 34, and in T132 transmits selection screen data which does not include the job ID to the printer 100.

After receiving from the mediation server 10 the selection screen data which does not include the job ID in T132, in T134 the printer 100 displays a selection screen SC1 represented by the selection screen data. The selection screen SC1 includes a field F1 and a button B1. The field F1 includes a character string "None" indicating that the job ID is not stored. The button B1 is used for obtaining a URL for transmitting image data which represents a print target image to the mediation server 10. In T136 the user selects the button B1 in the selection screen SC1 to obtain the URL. In this case, in T138 the printer 100 transmits a URL request for a URL to the mediation server 10.

After receiving the URL request from the printer 100 in T138, the mediation server 10 generates URL screen data which represents a URL screen SC2. The mediation server 10 first generates a URL 500 including a character string "http://printer.jp", a character string "p12345", and a character string "user2". Here, the character string "http://printer.jp" indicates a host name "printer.jp" of the mediation server 10. The character string "p12345" indicates a printer ID generated or specified in T128. The character string "user2" indicates the user name received in T126. Because the URL 500 includes the host name "printer.jp" of the server 10, the URL 500 indicates a location in the server 10. The URL 500 does not include the card ID "c67890", and instead includes the printer ID "p12345" associated with the card ID "c67890" in the card ID table 32. Consequently, the card ID "c67890" having relatively high confidentiality can be prevented from being displayed on the printer 100. That is, the card ID "c67890" having the relatively high confidentiality can be prevented from being obtained by a third person. Next, the mediation server 10 encodes the URL 500, and generates a QR code (registered trademark) CQ1. The mediation server 10 generates URL screen data which represents the URL screen SC2 including the generated URL 500, the generated QR code QC1, and a prescribed message. The prescribed message is a message for prompting the user to input a URL, read a QR code, or execute NFC communication. In the modifications, a two-dimensional code different from the QR code may be used, and a one-dimensional barcode may be used.

The mediation server 10 generates URL screen data including a write instruction. The write instruction is a command for instructing the printer 100 to write the URL 500 in a memory (not shown) in the NFC interface 106 of the printer 100. In T140, the mediation server 10 transmits the URL screen data to the printer 100.

After receiving the URL screen data from the mediation server 10 in T140, in T142 the printer 100 displays the URL screen SC2. The printer 100 writes the URL 500 in the memory (not shown) in the NFC interface 106 according to the write instruction included in the URL screen data. Thus, when NFC connection is established between the printer 100 and the terminal device (e.g., 200), the URL 500 in the internal memory (not shown) of the NFC interface 106 is transmitted to the terminal device via the NFC connection.

By watching the URL screen SC2, the user can learn that the user needs to execute one operation of the three operations for inputting the URL 500 to the terminal device (e.g., 200). A first operation is a manual input operation performed on an operation interface (not shown) of the mobile terminal 200 to input a character string indicating the URL 500 to the mobile terminal 200. A second operation is a reading operation of causing the camera 208 of the mobile terminal 200 to read the QR code QC1. A third operation is a closely placing operation of placing the NFC interface 206 of the mobile terminal 200 close to the NFC interface 106 of the printer 100.

(Process for Storing Print Data in Mediation Server)

Next, a process for storing a file which has image data representing a print target image in the mediation server 10 will be described with reference to FIG. 4. The process of FIG. 4 is executed after the URL screen SC2 is displayed on the printer 100 in T142 (FIG. 3).

In T150, the user executes the reading operation with respect to the mobile terminal 200. That is, in T150 the mobile terminal 200 reads the QR code QC1 by using the camera 208, and T152 decodes the QR code QC1 to obtain the URL 500. The user may execute the above described manual input operation or closely placing operation. When any one of the operations is executed, the mobile terminal 200 can obtain the URL 500. Next, in T154, the mobile terminal 200 transmits to the mediation server 10 a HyperText Transfer Protocol (HTTP) request including the URL 500 obtained in T152 as a transmission destination.

When receiving the HTTP request from the mobile terminal 200 in T154, in S20 the mediation server 10 determines whether a combination of the printer ID "p12345" and the user name "user2" included in the URL 500 is stored in the card ID table 32. In a situation shown in FIG. 4, the combination of the printer ID "p12345" and the user name "user2" are stored in the card ID table 32 (T128 in FIG. 3), and thus the mediation server 10 makes YES determination in S20. Subsequently, the mediation server 10 proceeds to T160.

When the combination of the printer ID and the user name included in the URL in the HTTP request is not stored in the card ID table 32, the mediation server 10 makes NO determination in S20. In this case, the mediation server 10 does not execute processes subsequent to T160, and in S22 transmits to the mobile terminal 200 an error notification indicating that Internet printing cannot be executed. When the user executes the manual input operation in T150 for example, a URL different from the URL 500 (e.g., a URL including an ID different from the printer ID "p12345" and the correct user name "user2") may be inputted to the mobile terminal 200. In this case, a combination of the different ID and the correct user name "user2" is not stored in the card ID table 32 (S20: NO), and in S22 the mediation server 10 transmits the error notification to the mobile terminal 200.

A comparative example where the URL 500 includes the printer ID "p12345" yet does not include the user name "user2" is assumed. That is, the URL 500 is "http://printer.jp/p12345" in this comparative example. In this case, when the user executes the manual input operation in T150, a different URL including a printer ID different from the printer ID "p12345" may be inputted to the mobile terminal 200. When the different printer ID is accidentally stored in the card ID table 32, the mediation server 10 transmits transmission screen data to the mobile terminal 200. As a result, the mediation server 10 stores print data associated with the different printer ID. That is, the mediation server 10 can store print data for a printer different from the printer 100 in the comparative example. In the present embodiment, the user needs to input both the printer ID "p12345" and the user name "user2" via the operation interface (not shown) of the mobile terminal 200. So, the mediation server 10 can be prevented from storing the print data for the printer different from the printer 100. However, the modifications may employ the configuration according to the comparative example, i.e., a configuration where a user name is not included in the URL 500.

In T160, the mediation server 10 transmits to the mobile terminal 200 transmission screen data which represents a transmission screen SC3. The transmission screen SC3 is a screen which prompts the user to select and transmit a print target file.

After receiving the transmission screen data from the mediation server 10 in T160, in T162 the mobile terminal 200 displays the transmission screen SC3. Further, in T164 the user selects the print target file (i.e., a file including a file name "file2.pdf") from one or more files stored in the mobile terminal 200. In T166 the mobile terminal 200 transmits the file selected in T164 to the mediation server 10.

After receiving the file from the mobile terminal 200 via the network interface 12 in T166, in T170 the mediation server 10 generates a job ID "j12346". Here, a job ID is allocated to each print job.

Next, in T172 the mediation server 10 specifies from the printer ID table 30 (see FIG. 2) the model name MN1 associated with the printer ID "p12345" which is included in the URL 500 received in T154, and specifies from the printer information table 28 (see FIG. 2) the print function information PF1 associated with the model name MN1. By using the specified print function information PF1, the mediation server 10 generates setting input screen data which represents a setting input screen SC4 for inputting print settings which the printer 100 can execute (i.e., print settings supported by the printer 100). The setting input screen SC4 is a screen for inputting the print settings such as the number of print copies, a sheet size, and settings whether duplex printing will be performed. In T174, the mediation server 10 transmits the generated setting input screen data to the mobile terminal 200.

In T176 the mobile terminal 200 receives the setting input screen data from the mediation server 10, and displays the setting input screen SC4. Further, in T178, the user inputs desired print settings through the setting input screen SC4, and in T180 the mobile terminal 200 transmits to the mediation server 10 print setting information PS2 indicating the print settings inputted by the user.

After receiving the print setting information PS2 from the mobile terminal 200 in T180, in T182 the mediation server 10 converts image data included in the file received in T166 to generate print data PD2. In this conversion process, the mediation server 10 converts the image data according to the print settings indicated by the print setting information PS2 by using a program corresponding to the model name MN1 specified in T172. The generated print data PD2 includes a data format which the printer 100 can interpret, and matches the print settings. The mediation server 10 generates a data ID "d12346" for identifying the print data PD2.

In T184, the mediation server 10 stores the printer ID "p12345", the job ID "j12346", the file name "file2.pdf", the print setting information PS2, the data ID "d12346", and the user name "user2" in the job ID table 34 so as to be associated with each other. Here, the printer ID "p12345" is included in the URL 500 received in T154, the job ID "j12346" is generated in T170, the file name "file2.pdf" is the file name of the file received in T166, the print setting information PS2 is received in T180, the data ID "d12346" is generated in T182, and the user name "user2" is included in the URL 500 received in T154. The mediation server 10 stores the data ID "d12346" and the print data PD2 in the memory 24 so as to be associated with each other. The mediation server 10 may delete the file received in T166 or may store the file in the memory 24. As described above, in the card ID table 32, the printer ID "p12345" and the user name user2" are associated with the card ID "c67890" (T128 in FIG. 3). In T184, the mediation server 10 stores the file name "file2.pdf", the printer ID "p12345", and the user name "user2" in the job ID table 34 so that the file name "file2.pdf" is associated with both the printer ID "p12345" and the user name "user2". In other words, the mediation server 10 stores the file having the file name "file2.pdf" in the memory so that the file is associated with the card ID "c67890" via the printer ID "p12345" and the user name "user2". In T186 the mediation server 10 transmits to the mobile terminal 200 a completion notification indicating that storing the file is completed. The completion notification includes the job ID "j12346" stored in T184.

After receiving the completion notification from the mediation server 10 in T186, in T188 the mobile terminal 200 displays the job ID "j12346" included in the completion notification. Consequently, the user can learn the job ID "j12346" for which a printing operation is to be executed.

Similarly to the above process, the user can further cause the mediation server 10 to store a file different from the file including the file name "file2.pdf". In this case, the same processes as T154-T188 are executed except the following points. In T164, the user selects a file having a file name "file3.pdf". In T166, the mobile terminal 200 transmits the file having the file name of "file3.pdf" to the mediation server 10. In T170, the mediation server 10 generates a job ID "j12347" different from the job ID "j12346". In T178 the user inputs print setting information PS3, and thus the mobile terminal 200 receives the print setting information PS3. In T180 the mobile terminal 200 transmits the print setting information PS3 to the mediation server 10. Here, the print setting information PS3 may be the same as or different from the print setting information PS2. In T182 the mediation server 10 generates print data PD3 and a data ID "d12347" for identifying the print data PD3, and in T184 stores the file name "file3.pdf", the job ID "j12346", and the data ID "d12347" in the job ID table 34. As a result, the mediation server 10 stores the two file names "file2.pdf" and "file3.pdf", the two job IDs "j12346" and "j12347", and the two data IDs "d12346" and "d12347" (i.e., two sets of print data PD1 and PD2) associated with both the printer ID "p12345" and the user name "user2" (i.e., the card ID "c67890").

(Process for Printing Print Data Stored in Mediation Server)

Figure 4:
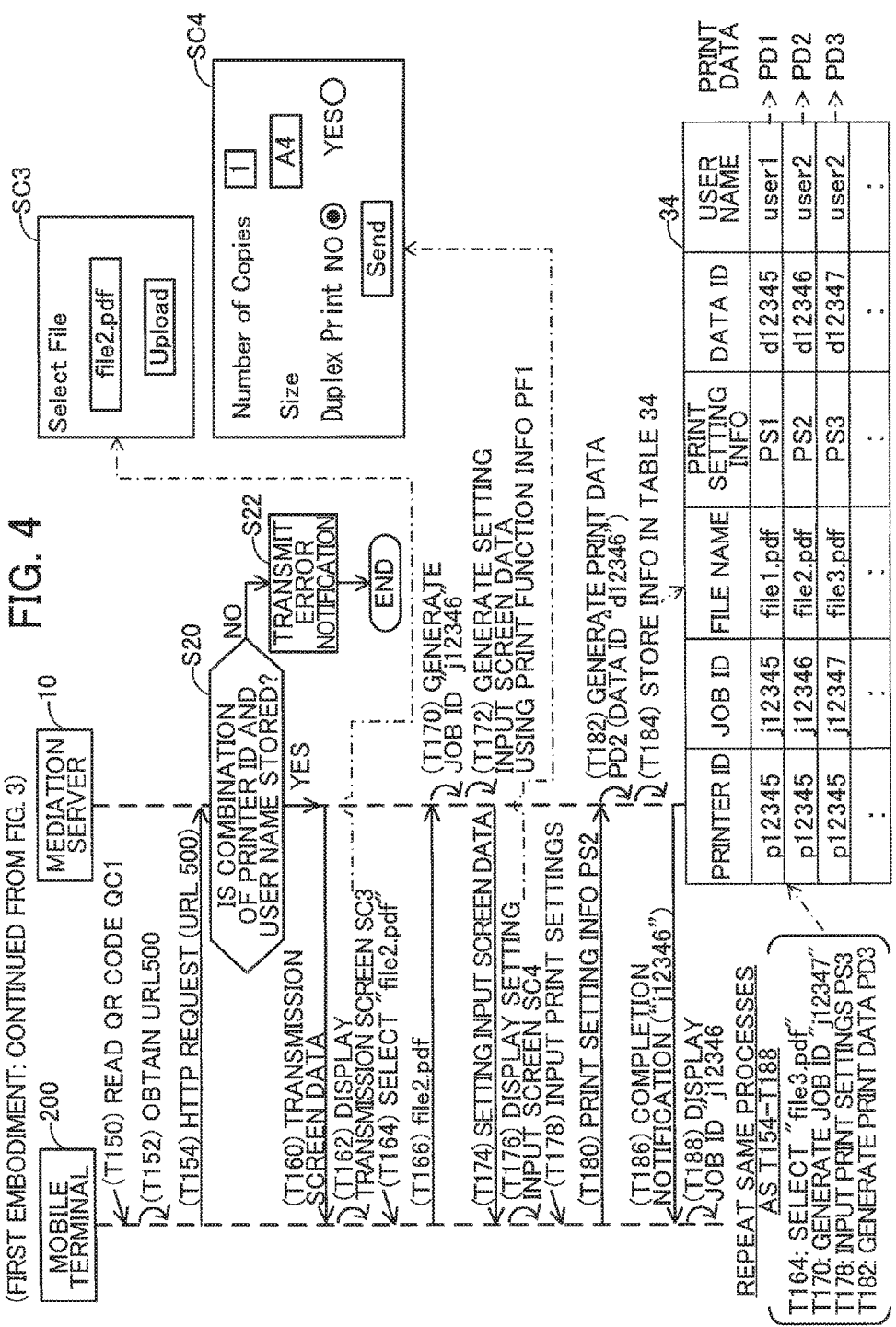
FIG. 4 is a sequence diagram illustrating a remaining process for storing print data in the mediation server continued from the process shown in FIG. 3 according to the first embodiment.
Figure 5:
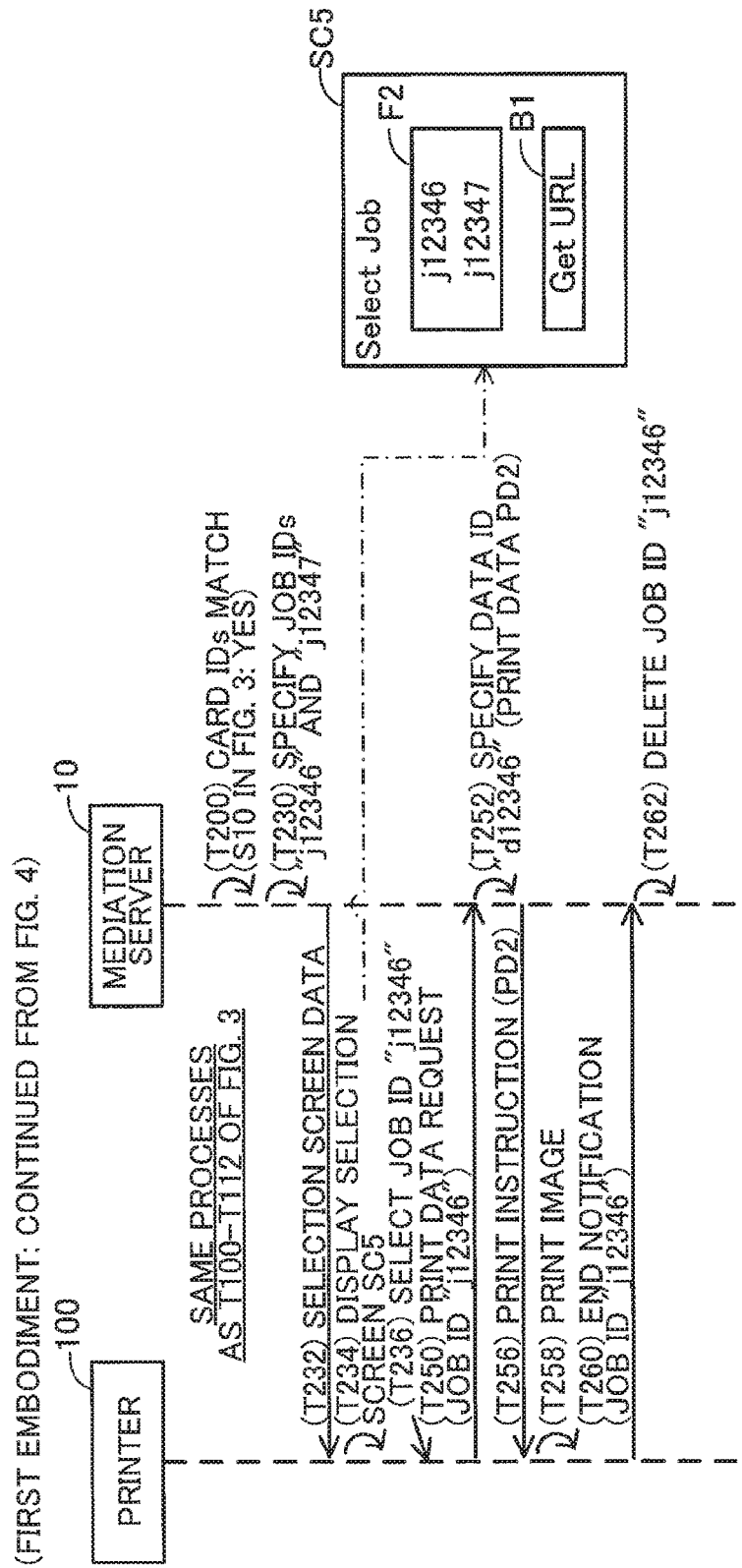
FIG. 5 is a sequence diagram illustrating a process for printing print data stored in the mediation server according to the first embodiment.

Next, a process for printing a file stored in the mediation server 10 will be described with reference to FIG. 5. The process shown in FIG. 5 is executed after the two job IDs "j12346" and "j12347" are stored in the job ID table 34 through the process shown in FIG. 4.

Figure 3:
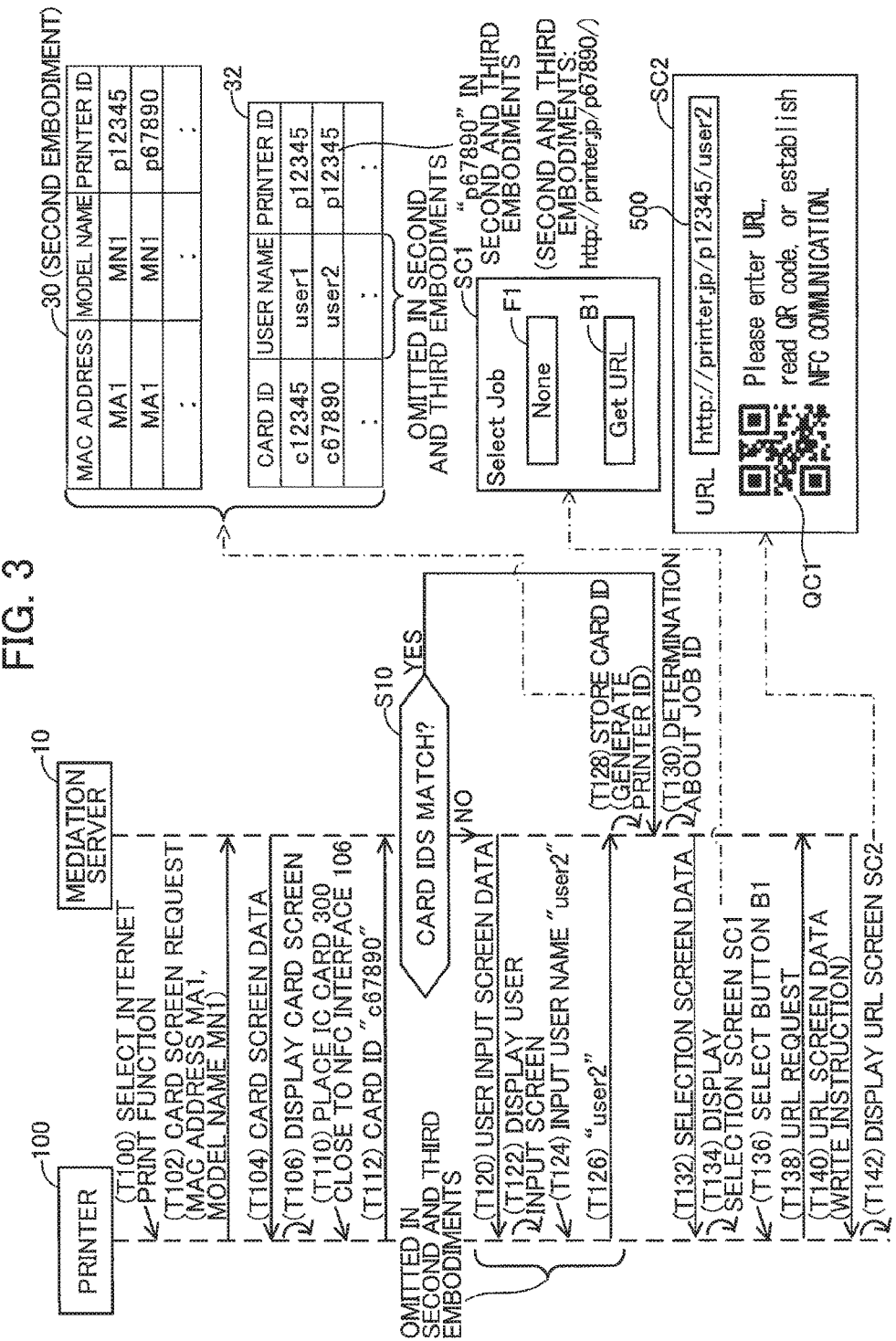
FIG. 3 is a sequence diagram illustrating a process for storing print data in a mediation server according to the first-third embodiments.

After the user executes the same operation as T100 in FIG. 3, the same processes as T102-T112 in FIG. 3 are executed. In T200 the mediation server 10 makes determination the same as S10 in FIG. 3. Because the card ID "c67890" is already stored in the card ID table 32 (T128 in FIG. 3), in T200 the mediation server 10 determines that the card ID "c67890" received in T112 matches the card ID "c67890" in the card ID table 32 (S10: YES in FIG. 3). In T230, the mediation server 10 specifies the printer ID "p12345" and the user name "user2" associated with the card ID "c67890" from the card ID table 32. Then, the mediation server 10 specifies the job IDs "j12346" and "j12347" associated with the specified printer ID "p12345" and user name "user2" from the job ID table 34. In T232, the mediation server 10 transmits selection screen data including the job IDs "j12346" and "j12347" to the printer 100.

After receiving the selection screen data including the job IDs "j12346" and "j12347" from the mediation server 10 in T232, in T234 the printer 100 displays a selection screen SC5 represented by the selection screen data. The selection screen SC5 includes a selection field F2 including the job IDs "j12346" and "j12347". In T236 the user selects the job ID "j12346" to be printed from the job IDs "j12346" and "j12347" in the selection field F2. According to this configuration, the user can select a desired print job from the two print jobs identified by the two job IDs "j12346" and "j12347", thereby improving the user friendliness. In T250, the printer 100 transmits to the mediation server 10 a print data request including the job ID "j12346" selected in T236. The print data request is a command for requesting print data.

After receiving the print data request including the job ID "j12346" from the printer 100 in T250, in T252 the mediation server 10 specifies from the job ID table 34 the data ID "d12346" associated with the job ID "j12346" included in the print data request. That is, the mediation server 10 specifies the print data PD2 identified by the data ID "d12346". In T256, the mediation server 10 obtains from the memory 24 the print data PD2 identified by the data ID "d12346", and transmits a print instruction including the print data PD2 to the printer 100. The print instruction is a command for causing the printer to execute printing according to the print data PD2.

After receiving the print instruction including the print data PD2 from the mediation server 10 in T256, in T258 the printer 100 prints an image represented by the print data PD2 (i.e., an image represented by the file having the file name "file2.pdf"). In T260, the printer 100 transmits an end notification including the job ID "j12346" to the mediation server 10. The end notification is a notification indicating an end of a print job identified by the job ID.

After receiving the end notification including the job ID "j12346" from the printer 100 in T260, in T262 the mediation server 10 deletes the job ID "j12346" and the print data PD2 associated with the job ID "j12346" from the job ID table 34.

(Advantages of Present Embodiment)

According to the system 2 of the present embodiment, when the URL 500 of the mediation server 10 is displayed on the printer 100, and the user inputs the URL 500 to the mobile terminal 200, the mobile terminal 200 transmits a print target file to the mediation server 10. Then, the user places the IC card 300, which stored the card ID "c67890", close to the NFC interface 106 of the printer 100 to obtain the URL 500 (T112 in FIG. 3). Specifically, the card ID "c67890" is inputted to the printer 100. In response to reception of the card ID "c67890", the URL 500 is transmitted to the printer 100 (T140), and the user inputs the URL 500 to the mobile terminal 200 (T150 in FIG. 4). The print data PD2 generated from the file having the file name "file2.pdf" is stored in the mediation server 10 (T184). Subsequently, the user places the IC card 300 close to the NFC interface 106 again in order to print an image of the print data PD2. Then, the card ID "c67890" is transmitted again to the mediation server 10 (T112 in FIG. 5). Because the card ID "c67890" received again matches the card ID "c67890" in the card ID table 32 (T200), the mediation server 10 transmits the print instruction including the print data PD2 to the printer 100 (T256). On the other hand, when receiving a card ID different from the card ID "c67890" from the printer 100, the mediation server 10 does not transmit the print instruction including the print data PD2 to the printer 100 (S10 executed in T200: NO). That is, the third person other than the user who is an owner of the IC card 300 cannot print the image of the print data PD2. Consequently, a printed material of the image of the file having the file name "file2.pdf" can be prevented from being provided to the third person.

(Correspondences)

The network interface 12 and the mobile terminal 200 are respectively examples of a communication interface and a terminal device. The card ID "c67890" received in T112 (FIG. 3) and the card ID "c67890" received in T112 of FIG. 3 are examples of a first identifier and a second identifier respectively. The URL 500 and the printer ID "p12345" are respectively examples of location information and related information. A situation before T112 is executed in FIG. 3 (a case where no file name associated with the card ID "c67890" is stored in the job ID table 34) is an example of a non-storage case. A situation after T184 is executed in FIG. 4 is an example of a stored case. The file having the file name "file2.pdf" and the print data PD2 are respectively examples of target image data and related image data. The IC card 300 is an example of a storage. The QR code QC1 is an example of a coded image. The two sets of image data included in the two files "file2.pdf" and "file3.pdf" are examples of a plurality of sets of image data. The two job ID "j12346" and "j12347" are examples of a plurality of sets of print identifies. The job ID "12346" is an example of a target print identifier.

T112 and T140 shown in FIG. 3 are examples of a first identifier receiving portion and a location information receiving portion respectively. T154, T166, and T184 shown in FIG. 4 are examples of a location information receiving portion, an image data receiving portion, and an image storage controlling portion. T112 and T256 executed in the process of FIG. 5 are examples of a second identifier receiving portion and a print instruction transmitting portion respectively.

(Second Embodiment) (Configurations of Tables)

In the following embodiments, explanations are made for only the features different from those of the first embodiment to avoid duplication. In a second embodiment, the tables 28 and 30 are the same as the first embodiment. A user name is not stored in the card ID table 32 in the second embodiment. Further, in the second embodiment, Personal Identification Number (PIN) codes are stored in the job ID table 34 instead of user names.

(Process for Obtaining URL of Mediation Server)

A process for obtaining a URL according to the second embodiment will be described with reference to FIG. 3. In the second embodiment, after making NO determination in S10, the mediation server 10 does not execute the processes T120-T126 and goes to the process T128.

In T128, the mediation server 10 generates the printer ID "p67890", and stores the MAC address MAL the model name MN1, and the generated printer ID "p67890" so as to be associated with each other in the printer ID table 30. Further, the mediation server 10 stores the card ID "c67890" and the generated printer ID "p67890" so as to be associated with each other in the card ID table 32. In the first embodiment, a plurality of card IDs can be associated with one printer ID. This is because the mediation server 10 can store the data ID so as to be associated with the printer ID and the user name included in the URL 500 in the job ID table 34 when receiving the URL 500 from the terminal device (T154 in FIG. 4). That is, the mediation server 10 can uniquely specify a card ID on the basis of a combination of the printer ID and the user name, and store the data ID so as to be associated with the card ID. On the other hand, in the second embodiment, only one card ID is associated with one printer ID. As described below, the URL 500 does not include a user name in the second embodiment. Therefore, when the plurality of card IDs would be associated with one printer ID, one card ID cannot be identified on the basis of the printer ID included in the URL 500. That is, according to the second embodiment, in T382 the mediation server 10 generates a printer ID uniquely specifying the card ID. In other words, the printer ID table 30 can store a plurality of printer IDs which specifies a single printer having the specific MAC address and the specific model name.

In the present embodiment, the URL 500 generated in T140 is "http://printer.jp/p67890" and does not include a user name (Process for Storing Print Data in Mediation Server)

Figure 6:
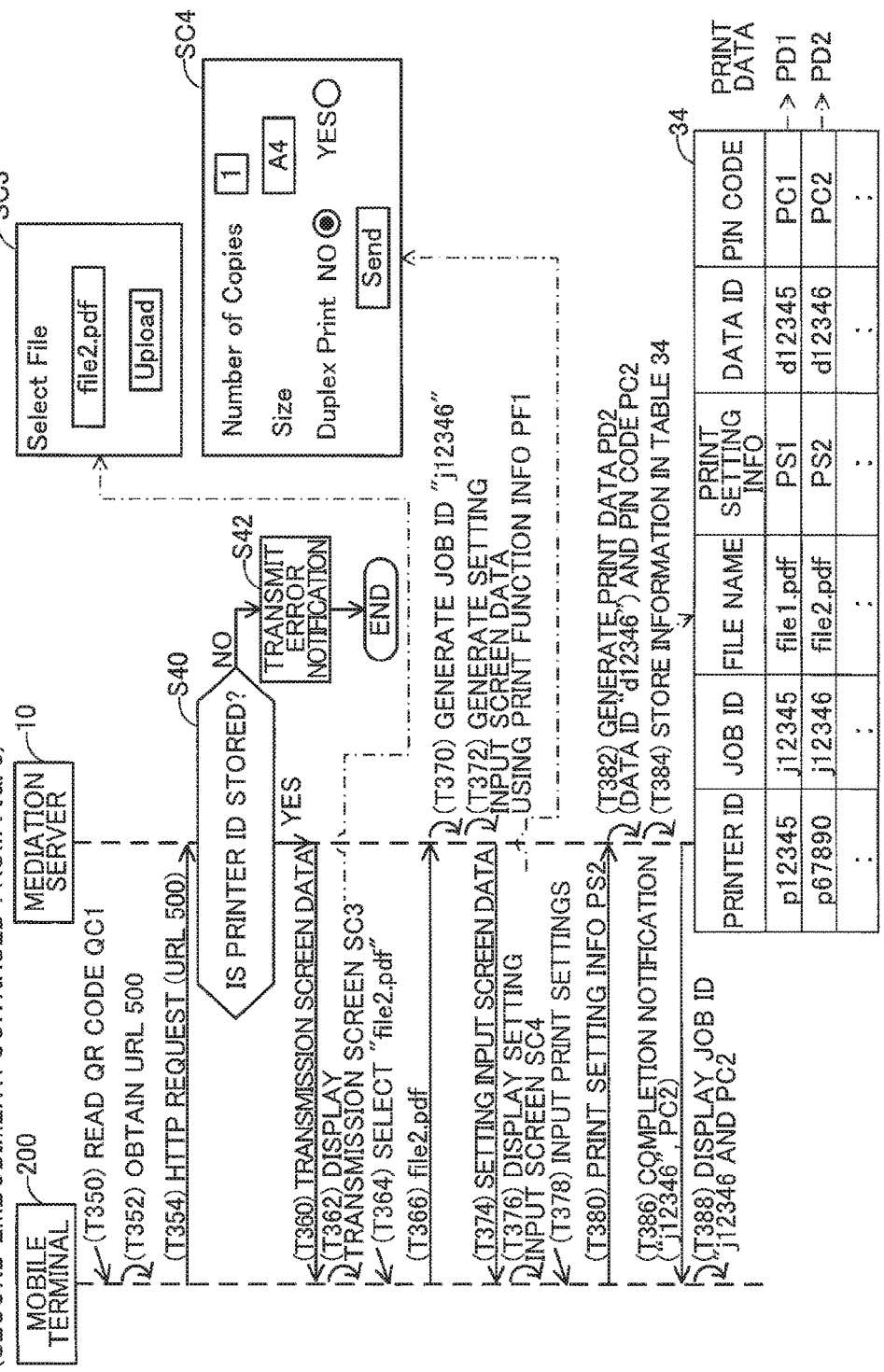
FIG. 6 is a sequence diagram illustrating a remaining process for storing print data in the mediation server continued from the process shown in FIG. 3 according to the second embodiment.

Next, a process for storing a file in the mediation server 10 according to the second embodiment will be described with reference to FIG. 6. The process of FIG. 6 is executed after the URL screen SC2 is displayed on the printer 100 according to the process of FIG. 3.

The processes T350-T354 are the same as the processes T150-T154 in FIG. 4 except that the URL 500 is "http://printer.jp/p67890". In S40, the mediation server 10 determines whether the printer ID "p67890" included in the URL 500 is stored in the card ID table 32. In a situation in FIG. 6, the printer ID "p67890" is stored in the card ID table 32 (T128 in FIG. 3). Therefore, the mediation server 10 makes YES determination in S40. Then, the process goes to T360. When a printer ID included in a URL in a HTTP request in T354 is not stored in the card ID table 32 (S40: NO), the mediation server 10 performs the process S42 the same as S22 in FIG. 3.

The processes T360-T380 are the same as the processes T160-T180 in FIG. 3. Similar to T182, in T382 the mediation server 10 generates the print data PD2, and, in addition, generates a PIN code PC2 which is authentication information allocated to each print job.

In T384 the mediation server 10 stores the printer ID "p67890", the job ID "j12346", the file name "file2.pdf", the print setting information PS2, the data ID "d12346", and the PIN code PC2 so as to be associated with each other in the job ID table 34. Here, the printer ID "p67890" is included in the URL 500, the job ID "j12346" is generated in T370, the file having the file name "file2.pdf" is received in T366, the print setting information PS2 is received in T380, the data ID "d12346" is generated in T382, and the PIN code PC2 is generated in T382. In T386, the mediation server 10 transmits to the mobile terminal 200 a completion notification including the job ID "j12346" and the PIN code PC2.

When receiving the completion notification from the mediation server 10 in T386, in T388 the mobile terminal 200 displays the job ID "j12346" and the PIN code PC2 included in the completion notification.

(Process for Printing Print Data Stored in Mediation Server)

Next, a process for printing a file stored in the mediation server 10 according to the second embodiment will be described with reference to FIG. 7. After the job ID "j12346" is stored in the job ID table 34 according to the process shown in FIG. 6, the process shown in FIG. 7 is executed in the second embodiment.

Figure 7:
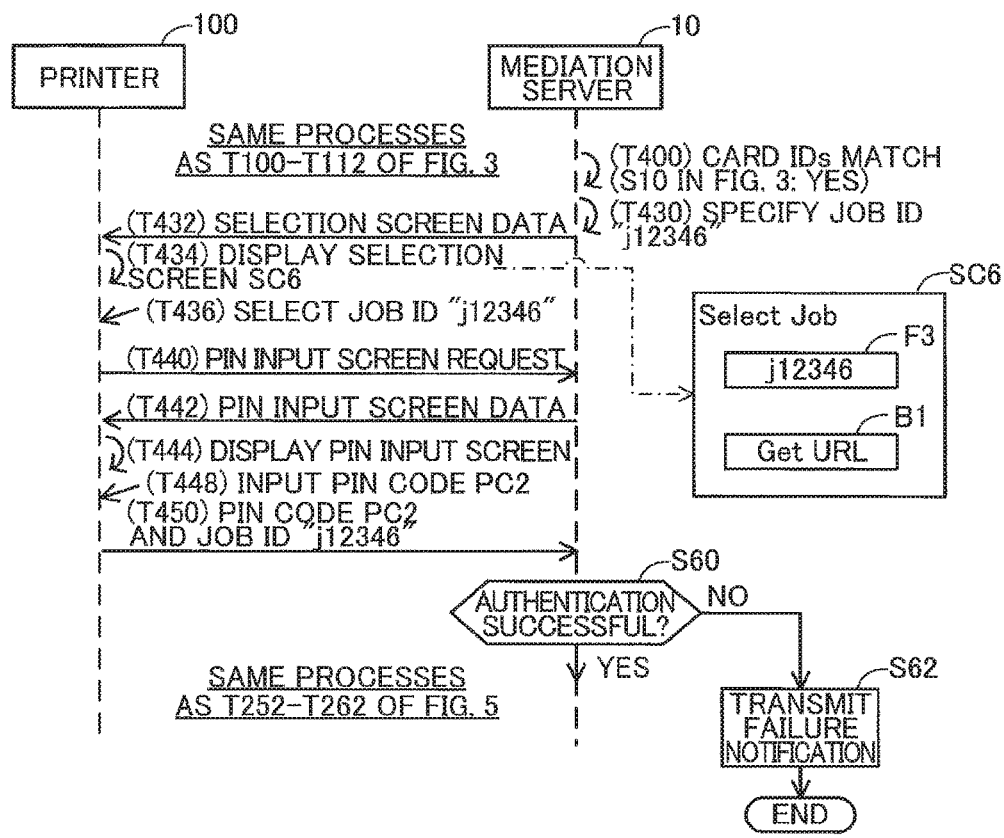
FIG. 7 is a sequence diagram illustrating a process for printing print data stored in the mediation server according to the second embodiment.

Similarly to the first embodiment, the same processes as T100-T112 in FIG. 3 are executed at the beginning of the process shown in FIG. 7. T400-T436 are the same as T200-T236 in FIG. 5 except that only the one job ID "j12346" is specified in T430 and a selection screen SC6 is displayed in T434. The selection screen SC6 is the same as the selection screen SC5 in FIG. 5 except that the selection screen SC6 includes a selection field F3 including only the one job ID "j12346".

In T440 the printer 100 transmits a PIN input screen request to the mediation server 10. The PIN input screen request is a command for requesting PIN input screen data which represents a PIN input screen. The PIN input screen is a screen for receiving an input of a PIN code.

When receiving the PIN input screen request from the printer 100 in T440, in T442 the mediation server 10 transmits the PIN input screen data to the printer 100.

When receiving the PIN input screen data from the mediation server 10 in T442, in T444 the printer 100 displays the PIN input screen. In T448 the user inputs through the PIN input screen the PIN code PC2 which is displayed in T388 in FIG. 6. In T450 the printer 100 transmits the PIN code PC2 inputted in T444 and the job ID "j12346" selected in T436 to the mediation server 10.

In T450 the mediation server 10 receives the PIN code PC2 and the job ID "j12346" from the printer 100. In this case, in S60, the intermediation sever 10 specifies a PIN code associated with the job ID "j12346" from the job ID table 34, and determines whether the specified PIN code matches the PIN code PC2 received in T444. In a situation in FIG. 7, the specified PIN code matches and the PIN code PC2. So, in S60 the mediation server 10 makes YES determination. In this case, the same processes as T252-T262 in FIG. 5 are executed.

When a code different from the PIN code PC2 is inputted in T444, the different PIN code received in T450 does not match the specified PIN code. In this case, in S60 the mediation server 10 makes NO determination. Subsequently, the process moves to S62. In S62, the mediation server 10 transmits a failure notification indicating a failure of PIN code authentication to the printer 100. That is, the print instruction is not transmitted to the printer 100.

According to the second embodiment, the printed material of the image of the file having the file name "file2.pdf" can be prevented from being provided to the third person similarly to the first embodiment. According to the second embodiment, in a case where a PIN code inputted to the PIN input screen by the user does not match a PIN code in the job ID table 34, the mediation server 10 does not transmit a print instruction to the printer 100. Even when the third person other than the user who is an owner of the IC card 300 places the IC card 300 close to the printer 100 by mistake, the third person does not know the PIN code PC2, and thus cannot allow the image of the file having the file name "file2.pdf" to print. Consequently, the printed material of the image of the file having the file name "file2.pdf" can be surely prevented from being provided to the third person. The PIN code PC2 is an example of a target authentication code and an example of an inputted authentication code.

(Third Embodiment) (Configurations of Tables)

In a third embodiment, the memory 24 of the mediation server 10 stores a barcode ID table 36 in addition to the tables 28-34. In the third embodiment, the tables 28-34 are the same as the tables 28-34 explained in the second embodiment.

The barcode ID table 36 stores, associated with each other, a barcode ID, a MAC address, a job ID, and a PIN code of each of one or more print jobs (see FIG. 2). The barcode ID is information which is a source of a one-dimensional barcode. When generating the job ID, the mediation server 10 generates further a barcode ID. Accordingly, the barcode ID is stored in the barcode ID table 36 as described below (see FIG. 8).

In the third embodiment, the printer 100 further includes a barcode reader 108 which reads the one-dimensional barcode.

(Process for Storing Print Data)

Next, a process for storing a file in the mediation server 10 according to the third embodiment will be described with reference to FIG. 8. The process for obtaining a URL of the mediation server 10 is the same as the process explained in the second embodiment (see FIG. 3). After the URL screen SC2 is displayed on the printer 100 according to the process shown in FIG. 3, the process shown in FIG. 8 is executed in the third embodiment.

When the user executes the same operation as T350 in FIG. 6, the processes the same as T352-T380 shown in FIG. 6 is executed at the beginning of the process shown in FIG. 8. Similarly to T382, in T582 the mediation server 10 generates the print data PD2 and the PIN code PC2. In T583 the mediation server 10 generates a barcode ID "b12346", and encodes the barcode ID "b12346" to generate barcode screen data which represents a one-dimensional barcode.

Similarly to T384, in T584 the mediation server 10 stores each information (i.e., the printer ID "p67890" and the job ID "j12346") in the job ID table 34. The mediation server 10 specifies the MAC address MA1 associated with the printer ID "p67890" from the printer ID table 30, and stores, so as to be associated with each other, the barcode ID "b12346" generated in T583, the specified MAC address MA1, the job ID "j12346", and the PIN code PC2 in the barcode ID table 36. In T586 the mediation server 10 transmits to the mobile terminal 200 a completion notification including the job ID "j12346", the PIN code PC2, and the barcode screen data generated in T583.

When receiving the completion notification from the mediation server 10 in T586, in T588 the mobile terminal 200 displays a one-dimensional barcode BC1 represented by the job ID "j12346", the PIN code PC2 and the barcode screen data included in the completion notification.

(Process for Printing Print Data Stored in Mediation Server)

Next, a process for printing a file stored in the mediation server 10 according to the third embodiment will be described. As shown in FIG. 8, the processes the same as T100-T112 in FIG. 3 and T400-T432 in FIG. 7 are executed according to the third embodiment similarly to the second embodiment in a situation that the one-dimensional barcode BC1 is displayed on the mobile terminal 200. However, the third embodiment is different from the second embodiment in the following points. That is, in T432 the mediation server 10 transmits selection screen data including an ID transmission instruction to the printer 100. The ID transmission instruction is a command for instructing the printer 100 to transmit a barcode ID included in one dimensional barcode to the mediation server 10 when the barcode reader 108 in the printer 100 reads the one-dimensional barcode. In T634 the mobile terminal 200 displays a selection screen SC7 including the selection field F3, the button B1, and a message for prompting the user to read a barcode.

The user can instruct a printing operation by using one of the barcode BC1 and the PIN code. When the user selects use of the PIN code, the same processes as the processes in the second embodiment, i.e., processes starting from T436 in FIG. 7 are executed. On the other hand, when the user selects use of the barcode BC1, processes starting from T660 are executed.

In T660 the user executes an operation of placing the mobile terminal 200 displaying the one-dimensional barcode BC1 close to the barcode reader 108 without selecting the job ID "j12346" included in the selection field F3 in the selection screen SC6. Thus, the one-dimensional barcode BC1 is decoded by the barcode reader 108. In T662 the printer 100 obtains the barcode ID "b12346" included in the one-dimensional barcode BC1 from the barcode reader 108. In T664 the printer 100 transmits the barcode ID "b12346" and the MAC address MA1 to the mediation server 10 according to the ID transmission instruction included in the selection screen data.

When receiving the barcode ID "b12346" and the MAC address MA1 from the printer 100 in T664, in T666 the mediation server 10 specifies the job ID "j12346" and the PIN code PC2 associated with the barcode ID "b12346" and the MAC address MA1 from the barcode ID table 36. The mediation server 10 specifies a PIN code associated with the job ID "j12346" from the job ID table 34, and determines whether the PIN code specified from the barcode ID table 36 matches the PIN code specified from the job ID table 34. In a situation shown in FIG. 8, the two PIN codes match, and thus in T668, the mediation server 10 specifies the data ID "d12346" associated with the specified job ID "j12346" from the job ID table 34. Subsequently, the processes the same as T256-T262 in FIG. 5 are executed. When the two PIN codes do not match, the mediation server 10 transmits a failure notification to the printer 100 similarly to S62 in FIG. 7. In the third embodiment, the printed material of the image of the file having the file name "file2.pdf" can be prevented from being provided to the third person similarly to the second embodiment. According to the third embodiment, when using a one-dimensional barcode, the user does not need to input a PIN code to the printer, thereby improving the user-friendliness. In the second embodiment, the user needs to perform a selection operation of a job ID from among a plurality of job IDs in the selection field F3 in the selection screen SC6. Compared with this, in the third embodiment, the user can obtain a printed material by simply allowing the printer to read a barcode, and does not need to select one job ID from job IDs, thereby improving the user-friendliness.

In T583 the mediation server 10 may encode information including both the barcode ID "b12346" and the printer ID "p67890" to generate barcode screen data which represents a one-dimensional barcode. In T584 the mediation server 10 may store the barcode ID "b12346" generated in T583, the printer ID "p67890", the job ID "j12346", and the PIN code PC2 so as to be associated with each other in the job ID table 36. In this case, in T662 the printer 100 may obtain the barcode ID "b12346" and the printer ID "p67890" included in the one-dimensional barcode BC1 from the barcode reader 108 and in T664 transmit the barcode ID "b12346" and the printer ID "p67890". Thus, when receiving the barcode ID "b12346" and the printer ID "p67890" from the printer 100 in T664, in T666 the mediation server 10 may specify the job ID "j12346" and the PIN code PC2 associated with the barcode ID "b12346" and the printer ID "p67890" from the barcode ID table 36.

While the disclosure has been described in detail with reference to the above embodiments, it would be apparent to those skilled in the art that various changes and modifications may be made thereto.

(Modification 1)

A storage or storage medium storing an identifier such as a card ID may not be the IC card 300 and may be a magnetic card, a Universal Serial Bus (USB) memory, or a memory card, for example. When the storage is the USB memory for example, the USB memory may store a specific ID, and the printer 100 may include a USB interface for obtaining information in the USB memory. In the modification 1, the specific ID is examples of first and second identifiers.

(Modification 2)

In the above embodiments, in T110 (FIG. 3) the printer 100 reads the card ID "c67890" from the IC card 300. In T112 the mediation server 10 receives the card ID "c67890" from the printer 100. Instead, when reading the card ID "c67890" from the IC card 300, the printer 100 may encrypt the card ID "c67890" to generate an encrypted ID. That is, when the printer 100 reads the card ID "c67890", the encrypted ID may be inputted to the printer 100. The mediation server 10 may receive the encrypted ID from the printer 100. In the modification 2, the encrypted ID is an example of a first or second identifier.

(Modification 3)

In T150 (FIG. 4) the user may execute an operation other than the three operations to input the URL 500 to the mobile terminal 200. For example, the mobile terminal 200 may be able to execute an Optical Character Recognition (OCR) process. The user may perform an operation of capturing a character string indicating the URL 500 displayed on the URL screen SC2 by using the camera 208 for the OCR process. The mobile terminal 200 may execute the OCR process on the image including the character string indicating the URL 500 captured by the camera 208. Through this process, the mobile terminal 200 may obtain the URL 500. In the modification 3, the operation for the OCR process performed by the mobile terminal 200 is an example of input of location information to the terminal device.

(Modification 4)

In the above embodiments, the URL screen data transmitted in T140 (FIG. 3) includes a write instruction for writing the URL 500 in the memory in the NFC interface 106. Then, the user places the mobile terminal 200 close to the printer 100 for NFC communication. Instead, the URL screen data may include an instruction for transmitting the URL 500 to the mobile terminal 200 by using other communication than the NFC communication. The mobile terminal 200 may display an execution screen including an execution button for executing the other communication. The user may perform an operation for selecting the execution button in the execution screen. The other communication may be Wi-Fi communication, infrared communication, Bluetooth (registered trademark) communication, and TransferJet (registered trademark), for example. In the modification 4, an operation for selecting the execution button by the user is an example of an operation for transmitting location information.

(Modification 5)

The mediation server 10 may not execute the process of T182 (FIG. 4) and in T184 may not store the data ID "d12346" in the job ID table 34. In this case, in T256 (FIG. 5), the mediation server 10 may transmit to the printer 100 a print instruction including both the file having the file name "file2.pdf" and the print setting information PS2. In the modification 5, the instruction including the file is an example of a print instruction.

(Modification 6)

In the above embodiments, in T182 (FIG. 4) the mediation server 10 generates the print data PD2, and in T184 stores the data ID "d12346" for identifying the print data PD2 in the job ID table 34. Instead, the mediation server may not generate the print data PD2 in T182, may not store the print data PD2 in T184, and may store the file name "file2.pdf" and the print setting information PS2 in the print ID table 34. In T252 (FIG. 5), the mediation server 10 may convert image data included in the file having the file name "file2.pdf" to generate the print data PD2 to be transmitted. In the modification 6, the file received in T166 is an example of related image data.

(Modification 7)

In the above embodiments, in T110 (FIG. 2) the user places the IC card 300 close to the NFC interface 106 of the printer 100. Thus, the card ID "c67890" of the IC card 300 is inputted to the printer 100. Instead, the communication system 2 may not include the IC card 300. In T110, the user may operate an unillustrated operation interface of the printer 100, and input a user ID for identifying the user to the printer 100. In the modification 7, the user ID is examples of first and second identifiers.

(Modification 8)

In the first embodiment, in T128 (FIG. 3) the mediation server 10 stores the card ID "c67890" and the printer ID "p12345" so as to be associated with each other in the card ID table 32, and in T184 (FIG. 4) stores the printer ID "p12345" and the data ID "d12346" for identifying the print data PD2 so as to be associated with each other in the job ID table 34. Instead, the mediation server 10 may not store the printer ID "p12345" in the card ID table 32, and may store the card ID "c67890" and the data ID "d12346" so as to be associated with each other in the job ID table 34. In the modification 8, the card ID "c67890" is an example of related information.

(Modification 9)

In the above embodiments, in T128 (FIG. 3) the mediation server 10 may not generate a printer ID. In this case, the mediation server 10 may store a printer ID in advance. In the modification 9, a generation portion can be omitted.

(Modification 10)

In the second embodiment, the processes T440-T450, S60 and S62 (FIG. 7) may not be executed. In the modification 10, the mediation server 10 which does not execute the processed T440-T450, S60 and S62 in the second embodiment is an example of a server not including a portion for receiving a user name.

(Modification 11)

In the first embodiment, the processes T382 and T386 (FIG. 6) and the processes T440-T450, S60 and S62 in FIG. 7 of the second embodiment may be executed. In the modification 11, the server may include a portion for a user name, a portion for transmitting a code, and a portion for receiving a code.

(Modification 12)

The processes T230-T252 (FIG. 5) may not be executed. In T256, the mediation server 10 may transmit to the printer 100 a print instruction including all sets of the print data PD2 and PD3 associated with the card ID "c67890" received in T112. In the modification 12, a identifier transmitting portion and a print identifier receiving portion can be omitted.

(Modification 13)

In the above embodiments, the processes of FIG. 3-7 are performed by the CPU 22 of the mediation server 10 executing the program 26 (that is, software). Instead, any of process may be performed by hardware such as a logical circuit.

The technical elements described in the present specification or drawings exhibit technical utility either independently or in various combinations and shall not be limited to the combinations set forth in the claims at the time of filing. Further, the technology illustrated in the specification or drawings achieves multiple objects at the same time, and achieving one of the objects itself demonstrates technical utility.

(Additional Example)

An additional example deriving from the third embodiment will be described with reference to FIG. 9. In the additional example, a process for obtaining a URL of the mediation server 10 is the same as the process in the second embodiment (see FIG. 3), and a process for storing print data in the mediation server 10 is the same as the process in the third embodiment (see FIG. 8).

A process for printing a file stored in the mediation server 10 according to the additional example will be explained. The printer 100 can execute the Internet print function to be executed in the above embodiments and, in addition, a barcode printing function of executing printing by using a barcode. In T700, in a situation that the one-dimensional barcode BC1 is displayed on the mobile terminal 200, the user uses a function screen displayed on the printer 100 to select the barcode printing function from the functions. In T702, the printer 100 transmits to the mediation server 10 a barcode screen request for barcode screen data which represents the barcode screen. The barcode screen is a screen for prompting the user to place the one-dimensional barcode displayed on the mobile terminal 200 close to the barcode reader 108.

When receiving the barcode screen request from the printer 100 in T702, in T704 the mediation server 10 transmits the barcode screen data to the printer 100. The barcode screen data includes an ID transmission instruction.

When receiving the barcode screen data from the mediation server 10 in T704, in T706 the printer 100 displays the barcode screen to the mobile terminal 200. Accordingly, the one-dimensional barcode BC1 displayed on the mobile terminal 200 is placed close to the barcode reader 108 by the user. Subsequently, the same processes as T660-T668 (FIG. 8) and T256-T262 (FIG. 5) are executed. In this regard, in T664, the printer 100 transmits the barcode ID "b12346" and the MAC address MA1 to the mediation server 10 according to the ID transmission instruction included in the barcode screen data. In the third embodiment, after the user places the IC card 300 close to the NFC interface 106, the user places the one-dimensional barcode BC1 close to the barcode reader 108 to execute printing. By contrast with this, in the additional example, the user can execute printing without placing the IC card 300 close to the NFC interface 106, improving the user-friendliness.

What is claimed is:

1. A server comprising:
a communication interface;
a memory; and
a processor configured to perform:
   receiving, in a non-storing case where the memory does not store image data in association with a first identifier identifying a user, from a printer via the communication interface the first identifier which has been inputted to the printer;
   after the first identifier is received in the non-storing case, transmitting first information to the printer via the communication interface for prompting that the first information is inputted to a terminal device, the first information being information for the terminal device to transmit image data to the server and including related information related to the first identifier;
   after second information matching the first information is inputted to the terminal device, receiving the second information from the terminal device via the communication interface;
   after the second information is inputted to the terminal device, receiving target image data from the terminal device via the communication interface;
   after the target image data and the second information are received from the terminal device, storing related image data in the memory, the related image data being related to the target image data, the related image data being stored in the memory so that the related image data is associated with the first identifier;
   receiving, in a storing case where the memory stores the related image data which is associated with the first identifier, a second identifier from the printer via the communication interface, the second identifier having been inputted to the printer; and
   transmitting a print instruction to the printer via the communication interface in a case where the received second identifier matches the first identifier which is associated with the related image data stored in the memory, the print instruction being for printing an image represented by the related image data which is associated with the first identifier, wherein the processor does not transmit of the print instruction to the printer in a case where the received second identifier does not match the first identifier which is associated with the related image data stored in the memory.

2. The server according to claim 1, wherein the first identifier is stored in an external storage in advance and inputted to the printer through the user's operation to allow the printer to read the first identifier from the external storage, the processor receiving the inputted first identifier from the printer via the communication interface.

3. The server according to claim 1, wherein the received second information is transmitted from the terminal device through one of a first procedure, a second procedure, and a third procedure,
   wherein in the first procedure a character string displayed on the printer is inputted to the terminal device so that the second information is inputted to the terminal device after the printer receives the first information from the communication interface, the character string represented by the first information,
   wherein in the second procedure an encoded image displayed on the printer is read by the terminal device so that the second information is inputted to the terminal device after the printer receives the first information from the communication interface, the encoded image being represented by encoded data obtained by encoding the first information,
   wherein in the third procedure the first information is transmitted to the terminal device from the printer so that the second information is inputted to the terminal device after the printer receives the first information from the communication interface.

4. The server according to claim 1, the processor is configured to further perform storing the first identifier and the related information after the first identifier is received in the non-storing case, the related information being different from the first identifier,
   wherein the first information does not include the first identifier, wherein the processor stores the related image data and the related information included in the first information in the memory, the related image data and the related information being stored in the memory in association with each other so that the related image data in the memory is associated with the first identifier via the related information.

5. The server according to claim 4, wherein the processor is configured to further perform generating the related information different from the first identifier after the first identifier is received from the printer in the non-storing case,
wherein the processor stores the first identifier and the generated related information in the memory in association with each other.

6. The server according to claim 1, wherein the processor is configured to further perform receiving a user name, which has been inputted to the printer, from the printer via the communication interface,
wherein the first information further includes the user name,
wherein a character string displayed on the printer is inputted to the terminal device so that the second information is inputted to the terminal device after the printer receives the first information from the communication interface, the character string being represented by the first information,
wherein the processor receives the second information after the second information having the related information, and the user name are inputted in the terminal device,
wherein the processor is configured to further perform receiving different location information from the terminal device via the communication interface after the different location information is inputted in the terminal device, the different location information being different from the second information and at least one of the related information and the user name is not included in the different location information,
wherein the processor does not store the related image data in the memory in a case where the different location information is received from the terminal device.

7. The server according to claim 1, wherein the processor is configured to further perform:
in a case where the related image data is stored in the memory, storing a target authentication code together with the related image data so that the target authentication code and the related image data are associated with the first identifier, wherein in the storing case the memory stores the target authentication code and the related image data so that the target authentication code an the related image data are associated with the first identifier;
transmitting the target authentication code to the terminal device via the communication interface after the related image data and the target authentication code are stored in the memory; and
receiving an inputted authentication code, which has been inputted to the printer, from the printer via the communication interface in the storing case,
wherein the processor transmits the print instruction to the printer in a case where the second identifier and the inputted authentication code are received from the printer in the storing case, in a case where the received second identifier matches the first identifier stored in the memory, and in a case where the inputted authentication code matches the target authentication code stored in the memory,
wherein the processor does not transmit the print instruction to the printer in a case where the inputted authentication code does not match the target authentication code stored in the memory.

8. The server according to claim 1, wherein the processor is configured to further perform:
receiving a plurality of sets of image data including the target image data via the communication interface from the terminal device to which the second information has been inputted;
storing a plurality of sets of related image data and a plurality of print identifiers in the memory so that the plurality of sets of related image data and the plurality of print identifiers are associated with the first identifier, the plurality of sets of related image data being related to respective ones of the plurality of sets of image data, the plurality of print identifiers corresponding to respective ones of the plurality of sets of related image data, each of the plurality of print identifiers identifying a print operation for printing an image represented by a corresponding set of related image data, wherein in the storing case, the plurality of sets of related image data and the plurality of print identifiers are stored in the memory so that the plurality of sets of related image data and the plurality of print identifiers are associated with the first identifier, the plurality of sets of related image data being related to respective ones of the plurality of sets of image data;
transmitting to the printer via the communication interface the plurality of print identifiers which is associated with the first identifier in a case where the second identifier is received from the printer in the storing case, and in a case where the received second identifier matches the first identifier stored in the memory;
receiving from the printer via the communication interface a target print identifier selected from among the plurality of print identifiers after the plurality of print identifiers is transmitted to the printer; and
transmitting a print instruction for printing an image which is identified by the target print identifier and represented by a corresponding set of related image data.

9. The server according to claim 1, wherein the first information includes first location information designating a location in the server.

10. A non-transitory computer readable storage medium storing a set of program instructions installed on and executed by a computer for controlling a server having a communication interface and a memory, the set of program instructions comprising:
receiving, in a non-storing case where the memory does not store image data in association with a first identifier identifying a user, from a printer via the communication interface the first identifier which has been inputted to the printer;
after the first identifier is received in the non-storing case, transmitting first information to the printer via the communication interface for prompting that the first information is inputted to a terminal device, the first information being information for the terminal device to transmit image data to the server and including related information related to the first identifier;

after second information matching the first information is inputted to the terminal device, receiving second information from the terminal device via the communication interface;

after the second information is inputted to the terminal device, receiving target image data from the terminal device via the communication interface;

after the target image data and the second information are received from the terminal device, storing related image data in the memory, the related image data being related to the target image data, the related image data being stored in the memory so that the related image data is associated with the first identifier;

receiving, in a storing case where the memory stores the related image data which is associated with the first identifier, a second identifier from the printer via the communication interface, the second identifier having been inputted to the printer; and transmitting a print instruction to the printer via the communication interface in a case where the received second identifier matches the first identifier which is associated with the related image data stored in the memory, the print instruction being for printing an image represented by the related image data which is associated with the first identifier, wherein the transmitting a print instruction to the printer is not performed in a case where the received second identifier does not match the first identifier which is associated with the related image data stored in the memory.

11. The non-transitory computer readable storage medium according to claim 10, wherein the first information includes first location information designating a location in the server.

* * * * *

UNITED STATES PATENT AND TRADEMARK OFFICE
CERTIFICATE OF CORRECTION

PATENT NO. : 10,291,821 B2  
APPLICATION NO. : 15/912787  
DATED : May 14, 2019  
INVENTOR(S) : Ken Saito Page 1 of 1

It is certified that error appears in the above-identified patent and that said Letters Patent is hereby corrected as shown below:

In the Claims

Column 20, Claim 1, Line 28 should read:
wherein the processor does not transmit the print Column 21, Claim 6, Line 31 should read:
mation and the user name are inputted in the terminal Column 21, Claim 7, Line 54 should read:
and the related image data are associated with the first Column 23, Claim 10, Line 2 should read:
inputted to the terminal device, receiving the second infor- Signed and Sealed this  
Twenty-seventh Day of August, 2019

Andrei Iancu  
*Director of the United States Patent and Trademark Office*